United States Patent [19]

Lemelson

[11] 4,316,073
[45] Feb. 16, 1982

[54] DOCUMENT RECORDING METHOD

[76] Inventor: Jerome H. Lemelson, 85 Rector St., Metuchen, N.J. 08840

[21] Appl. No.: 831,173

[22] Filed: Feb. 10, 1978

Related U.S. Application Data

[63] Continuation-in-part of Ser. No. 523,865, Nov. 14, 1974, abandoned.

[51] Int. Cl.$^3$ ............................................. G01D 15/14
[52] U.S. Cl. ...................... 219/121 LL; 219/121 LW; 346/76 L
[58] Field of Search ..... 219/121 L, 121 LM, 121 LL, 219/121 LW; 346/76 L

[56] References Cited

U.S. PATENT DOCUMENTS

| | | | |
|---|---|---|---|
| 3,220,013 | 11/1965 | Harris | 346/76 L |
| 3,226,527 | 12/1965 | Harding | 219/121 L |
| 3,573,847 | 4/1971 | Sacerdoti | 346/76 L |
| 3,803,637 | 4/1974 | Martin et al. | 346/76 L |
| 3,832,547 | 8/1974 | Silverman | 346/76 L |
| 4,024,545 | 5/1977 | Dowling et al. | 346/76 L |

Primary Examiner—C. C. Shaw

[57] ABSTRACT

An apparatus and method are provided for recording information on documents by means of pulsed radiation. In one form, a record member such as a sheet of paper, plastic, paper board or other suitable material is intersected by pulses of intense light energy generated by a laser. The pulsed energy is of sufficient intensity to either burn holes completely through the sheet material, form cavities therein or to burn and discolor the sheet material or a film applied thereto. The sheet and radiation are relatively moved in such a manner as to form spots or holes in the sheet material which spots or holes have the contour configurations of a plurality of characters such as numbers or letters which may be visually discerned and read as words and/or numerical information just as if the characters were to be printed on the sheet. In a particular form, character defining arrays of holes burned through the sheet are utilized to permit the passage of printing ink therethrough and the sheet may be used as a stencil for making multiple copies of printed information. The beam generated by the laser may be deflection controlled along two axes at its source permitting the beam to ascribe not only the contour of each character but a plurality of characters and a plurality of lines thereof. In a specific form, a plurality of sheets of recording material may be disposed, one behind another, and the radiation may be sufficient to pass through each of the sheets to form a plurality of copies containing holes arrayed in each copy to define similar character configurations across each each sheet.

8 Claims, 5 Drawing Figures

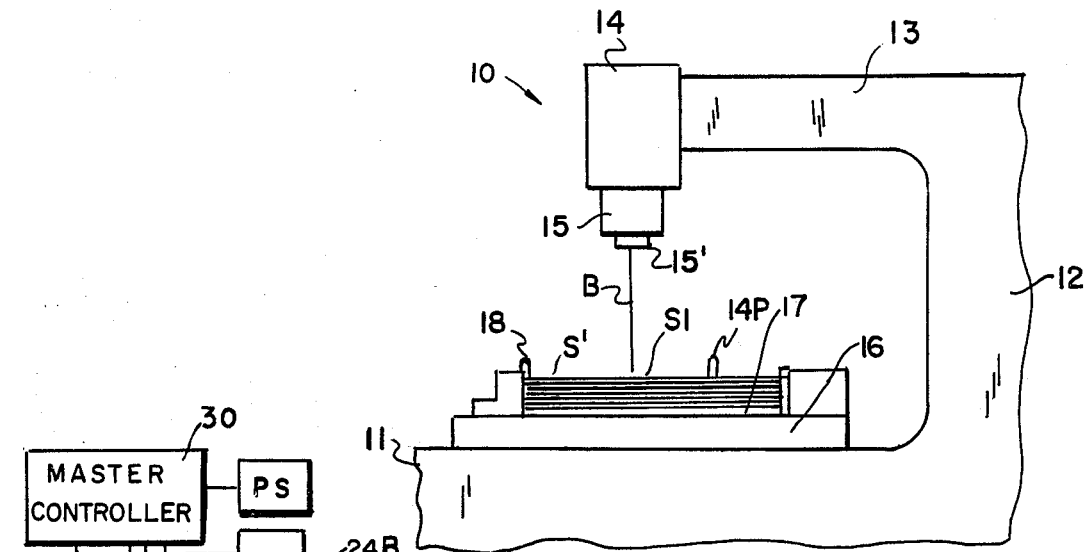
Fig. 1
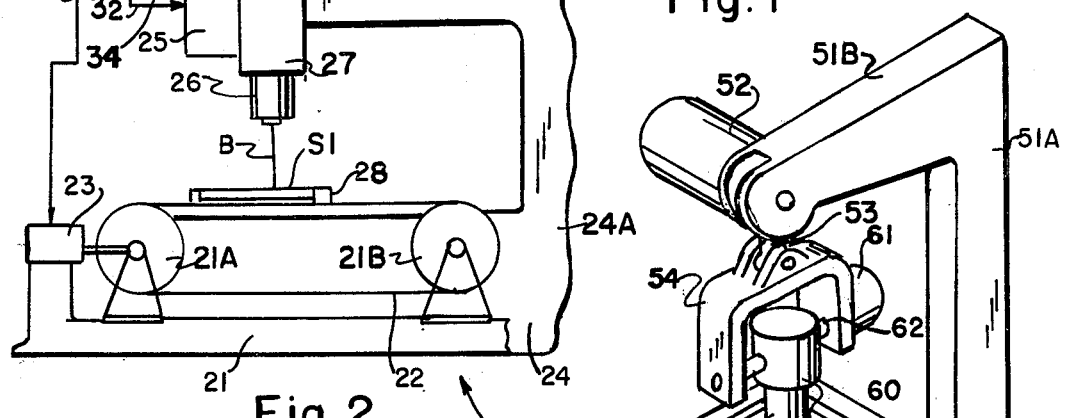
Fig. 2
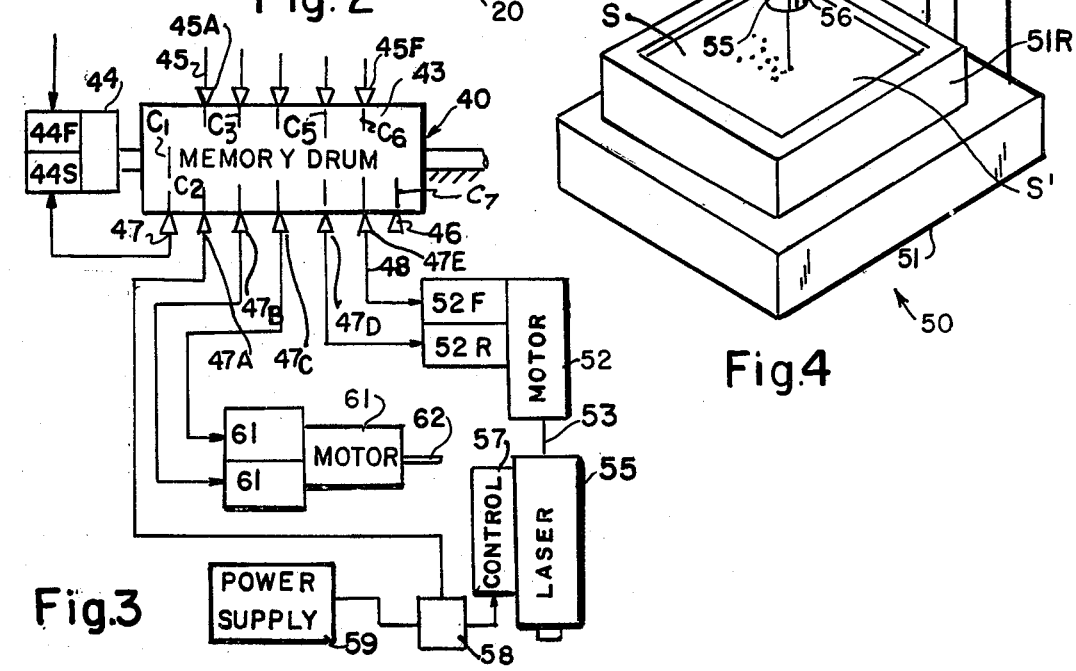
Fig. 3
Fig. 4

DOCUMENT RECORDING METHOD

Related Applications

This is a continuation-in-part of application Ser. No. 523,865 filed Nov. 14, 1974, now abandoned for Document Recording Apparatus.

SUMMARY OF THE INVENTION

This invention relates to an apparatus and method for recording alpha-numeric character information along selected portions of documents by burning or discoloring the document material in a manner to form a plurality of visual spots, cavities or holes in the document material arrayed in the configurations of characters.

Various techniques have been employed to record character information on documents other than by the application of printing ink to effect the recordings. One of these techniques has involved the die cutting of a plurality of holes through one or more documents which holes are close enough together and extend in paths configured to represent characters such as alphabetical and numerical characters. However, this technique is a relatively slow recording operation which has not been applied to the recording of extensive information due to the complexity of the die cutting machinery, difficulties experienced in varying the arrangements of the hole cutting dies, the time required to die cut the record member and record handling difficulties which are experienced.

The instant invention is directed to a recording apparatus and method for recording alphabetical and numerical characters by means of a pulsed radiation beam which is deflection controlled and controllably pulsed in synchronization with such deflection control in a manner to cause it to intermittently intersect a record member and burn, discolor or drill holes completely through the record member of a plurality of such record members stacked together, to effect visually readable recordings which appear in the configurations of alphabetical and numerical characters, each defined by a plurality of discolored spots, cavities or holes produced by respective pulses of beamed radiation.

Accordingly, it is a primary object of this invention to provide a new and improved apparatus and method for recording information.

Another object is to provide an apparatus and method for rapidly recording information configurations of visually readable characters along the surface of an article or a record member.

Another object is to provide an apparatus and method for recording the same information simultaneously on a plurality of record members.

Another object is to provide an apparatus and method for rapidly forming characters as a series of perforations which are simultaneously made in the plurality of sheet record members.

Another object is to provide an apparatus and method for automatically effecting character recordings along surfaces by means of intense beam radiation wherein the recordings are in the form of spot-like discolorations, cavities, or holes through the member which spot-like areas, cavities or holes are generated by pulses of radiation of equal duration and intensity and wherein the spot-like areas, cavities or holes for similar characters are substantially similarly located with respect to each other thereby providing similar character recordings which may be easily machine read.

Another object is to provide a very rapid means for recording visually readible alpha-numeric characters without ink and without mechanically engaging the surface on which such recording is effected with an ink applying means.

Another object is to provide an apparatus and method for rapidly and simultaneously producing a plurality of masks for use in product fabrication and decoration.

Another object is to provide an apparatus and method for simultaneously producing a plurality of flat, sheet-like articles of predetermined contour.

Another object is to provide an apparatus and method for rapidly recording information along selected areas of one or more flat sheet forms.

Yet another object is to provide an apparatus and method for simultaneously recording information on a container for an article and the article disposed within the container by means of intense radiation penetrating the wall of the container.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view of part of an apparatus which may be utilized to simultaneously perforate a plurality of sheets such as record members to simultaneously provide recordings in each record member in the form of arrays of holes therethrough defining characters;

FIG. 2 is a side view of a modified form of the apparatus of FIG. 1 which also illustrates control means therefor;

FIG. 3 is a schematic diagram of one form of control system for an apparatus of the type illustrated in FIG. 1 or 2;

FIG. 4 is an isometric view of a modified form of laser recording apparatus.

Figure 5:
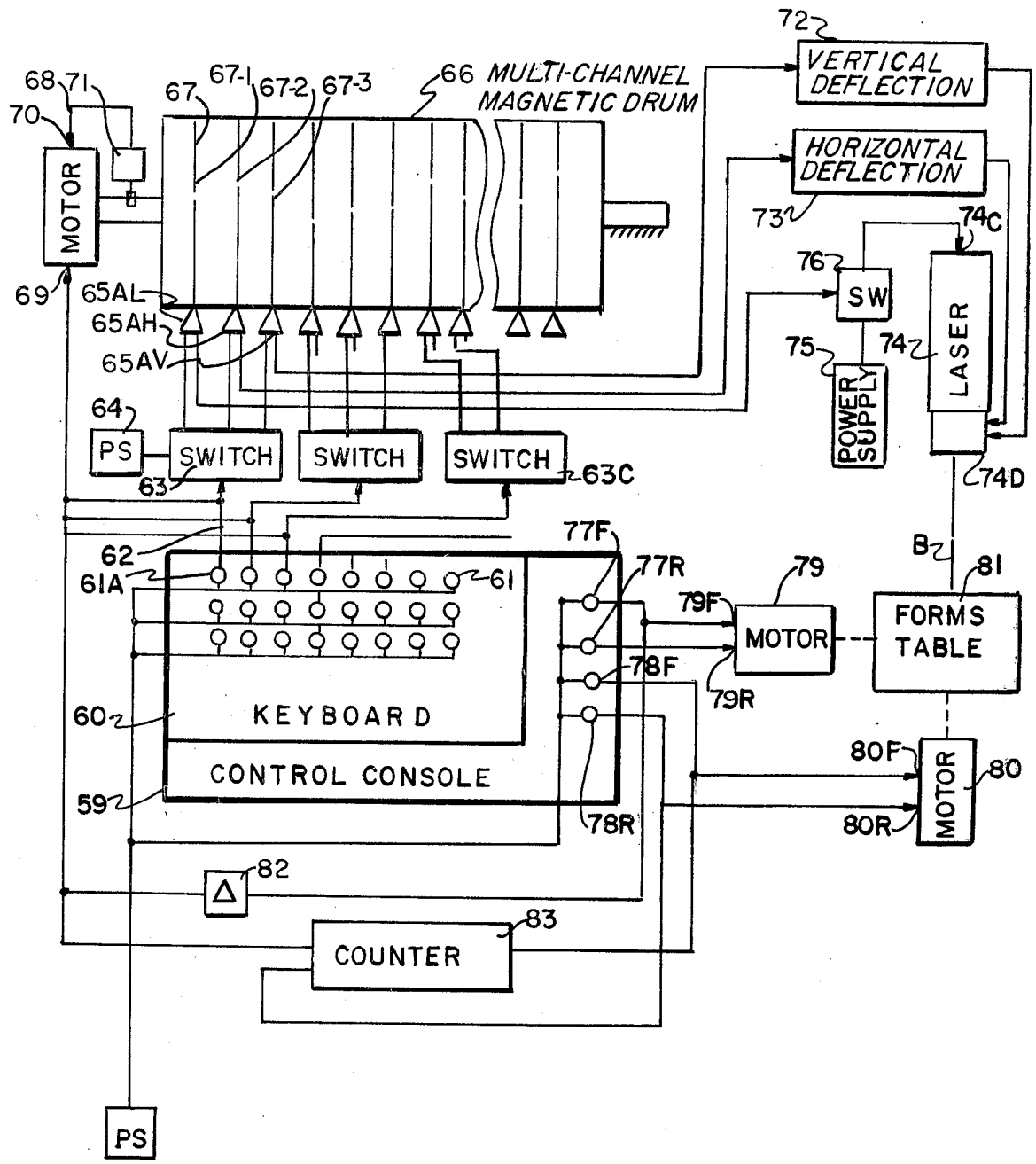
FIG. 5 is a schematic diagram of a modified control system for apparatus of the type defined in the instant invention.

The instant invention employs an intense radiation beam or a plurality of radiation beams which are operable to provide a plurality of small holes in a plurality of sheets of recording material such as paper, plastic, metal or laminates, disposed in a stacked array within the scanning field of the radiation or movable through the scanning field under automatic control. Movement of the radiation beam or beams and/or the stacked array of record sheets is predeterminately controlled in synchronization with controlled pulsing of the radiation beam or beams in such a manner as to cause the beam or beams to scan a selected area or areas of the record member, such as a band area thereof along which recordings of characters are desired, and to burn or erode spot-like areas of the outermost record sheet and those stacked therewith, in the configurations of characters such as alphabetical and/or numerical characters which may be visually read from each record sheet so drilled or burned with holes therethrough. In other words, the character information so generated by relatively moving the stack of record members and the radiation beam generating means and pulsing the beam generating means, are of similar configuration on each record sheet and are produced without the need for carbon or other chemicals disposed between the sheets.

The recordings may be effected and readable as holes formed in each of the record sheets by the intense radiation beam of a laser or electron gun, a series of beams generated by a single laser or electron gun or by a plurality of lasers or electron guns. In certain instances, the information so generated may also be applied to one or more of the sheets beneath the outermost sheet by selectively heating a chemical coated on or disposed within the sheet by means of an intense radiation beam or beams directed against the outermost sheet.

While the apparatus provided in the drawings is described as being controlled by a master controller or computer to predeterminately burn holes in the form of character configurations in a plurality of record sheets, it is noted that it may also be operated by selectively manually activating key switches located on a control panel or by signals received from a remote location as generated by a similar manual key operated system or computer.

FIG. 1 illustrates an apparatus 10 for simultaneously recording information in a plurality of record sheets S arranged in a stack S', one above the other and preferably in surface engagement with each other with the outermost sheet S1 being disposed facing a radiation beam generating device 15, such as a laser or electron gun, supported on a mount 14 which is located in direct alignment with the stack of sheets S. The intense radiation beam B is shown directed downwardly from the output end 15' of the beam generator 15 against the surface of the outermost sheet S1 and operates, preferably in a pulsed mode, to intersect selected areas of the outermost sheet and to penetrate therethrough to one or more sheets located beneath the outermost sheet and forming the stack of sheets.

The stack S' of sheets S may be bound together or unbound and are shown supported within a receptacle 17 which itself is supported on a platen or mount 16 secured to the upper surface of a bed or support 11. A vertical arm or frame 12 extends upwardly from the bed 11 and an outwardly projecting portion 13 thereof is secured to the housing 14 for the beam generating device 15. Notation 18 refers to a plurality of locating pins or clamping devices which may be fixed on the receptacle 16 for predetermining the location of the stacked sheets when they are moved against said pins or clamps so that a recording operation with respect to a selected area or areas of the stacked sheets may be properly effected when the beam B is properly deflection controlled and pulsed to cause it to scan the selected area or areas of the outermost record sheet and to penetrate therethrough to similar selected areas of sheets therebeneath.

If the beam generating device 15 is an electron gun, its beam may be deflection controlled and intensity modulated to properly pulse the beam for burning closely spaced holes through the sheets as it is deflection controlled to form hole-shaped characters, by means of generating suitable pulsed electrical signals either directly on the input to the beam generating anode or a control gate for gating electrical energy from a supply source to said anode and proper deflection control of the beam to cause it to scan character defining areas of the surface of the outermost sheet S1 by generating suitable deflection control signals on the vertical and horizontal deflection control plates of the electron gun.

If the device 15 is a laser, it may be intensity modulated and deflection controlled in its operation by means such as illustrated in U.S. Pat. No. 3,534,166 wherein the laser is of sufficient intensity to generate beam power of the intensity required to penetrate the multiple sheets S of the stacked array S' thereof. The signals controlling the pulsing of the beam of the electron gun or laser and those applied to properly deflection control the beam to scan character defining areas of the record sheet S1 as the beam is pulsed to generate similar character information therein by creating a series of holes in the outermost sheet and those therebeneath, may be generated from a memory such as a magnetic drum, disc or tape or other form of signal generating device such as a core memory, solid state memory or film memory which generates selected and desired signals when activated. Signals generated by selectively activating the keys of the keyboard containing switches which selectively connect selected electronic circuitry to selected signal generating means connected to the laser or electron gun modulating and a deflection control means, may also be utilized to selectively record character information in all or selected of the sheets forming the stack S'.

While in FIG. 1, the sheets are held stationary as the beam B is pulsed and deflection controlled in two directions to burn character representations in the sheets S, in FIG. 2, an apparatus 20 is provided which includes a conveyor 21 operable to move the stack S' of sheets in one direction on a conveyor belt 22 while the beam sweeps back and forth across the surface of the outermost sheet to burn characters in all of the sheets of the stack. The conveyor 21 is composed of an endless belt 22 driven around respective drums 21A and 21B by the selective control of a drive motor 23. The conveyor and motor 23 are supported by a frame 24 having an upstanding column 24A and an outwardly extending arm 24B which supports a housing 27 containing an electron gun or laser 26 located to direct its output beam B against the outermost sheet S1 of the stack S' thereof. The stacked sheets are supported by a tray or pallet 28 which is secured to or rests on the upper surface of the belt 22 and travels therewith in a given direction to bring the stacked sheets into alignment with the beam B and to predeterminately move said sheets, either at constant speed or intermittently, during the recording operation to permit the beam to scan different levels of the recording area or areas of the sheets held by the tray 28.

A master controller 30 such as a computer, multi-circuit timer, record disc, drum, tape or other form of memory is operable to generate control signals on a plurality of outputs 31–34 thereof when operated by energy provided by a power supply PS. Output 31 of the controller 30 extends to constantly or intermittently control the motor 23 driving the conveyor belt 22. Outputs 32–34 extend respectively to the intensity modulation input of the laser or electron gun 26 while outputs 33 and 34 of the master controller 30 extend respectively to the vertical and horizontal deflection control means for the electron gun or laser 26. Thus, as suitable intensity and deflection control signals are generated by the master controller 30, they are transmitted to the motor 23 and the outputs 32–24 extending to the control means 25 which contains suitable circuits and devices for controlling the intensity and the deflection of the recording beam B in accordance with the signals generated by the master controller.

Further details of a control system of the type shown in FIG. 2 are illustrated in FIG. 3 wherein the system 40 employs a memory drum 43 containing a plurality of record tracks denoted C1-C7, each of which may be addressed by signals emanating from a computer or keyboard which are recorded on the respective tracks of the drum by a plurality of recording record heads denoted 45A-45F.

Once a program of suitable control signals are recorded on the respective tracks of the record drum 40, they may be reproduced therefrom once or any number of times by a plurality of magnetic pick-up heads denoted 46A-46F. When the drum 43 is driven at constant speed by a constant speed motor 44, the selectively recorded signals on each of the circular tracks of the drum are picked up heads 46A-46G at the proper time intervals during a control cycle and are respectively amplified and passed therefrom to respective controls for intensity modulating and deflection controlling a beam generating device such as the described laser or electron gun. The motor 44 driving the memory drum 43 is initially started by closing a stop control switch 44F, after the stacked array of record sheets or cards S is disposed on the receptacle or tray 28 and the stack is in direct alignment with the electron gun or laser.

In FIG. 3 a first motor 52, such as a reversible stepping motor is employed to deflection control in the first direction a laser or electron gun 55 or an optical component such as a mirror adapted to receive the beam thereof, while a second motor 61 is employed to deflection control said laser or mirror in a second direction, such as a direction perpendicular to the direction defined by operation of motor 52. By recording suitable deflection control command signals, such as pulse trains or binary code signals which are operable, when reproduced and fed to the controls for motors 52 and 61, the laser beam may be made to scan areas of the outermost sheet S1 of the stack of sheets in paths which define the configurations of characters. Such character signal recordings on the memory drum 43 are reproduced by magnetic pick-up heads 46A-46D and are employed to properly deflection control the beam B of the laser while the beam is pulsed so as to burn the proper arrays of holes in the configurations of characters such as words, names and sentences extending in a given direction.

The signals generated when the magnetic pick-up 46A scans track C1 of the drum 43, may comprise pulsed signals which are fed to the switching input of normally open, monostable switch 58 which switch is closed for short periods of time as determined by the pulses energizing same such that the beam B is pulsed as it is deflection controlled to define arrays of characters burned in the stacked sheets defining, for example, human readable information.

Pick-ups 47A and 47B respectively connected to the forward and reverse controls 61F and 61R of a motor 61 which is utilized to pivot or move the laser housing back and forth in a first given direction while a second motor 52 is driven in a forward or reverse mode by signals generated as reproduced by reproduction heads 46D and 46E scanning tracks C5 and C6 of the drum 43 and fed respectively to the reverse and forward control inputs 52R and 52F of the motor 52. Motors 52 and 61 may be respective rotary stepping motors connected as illustrated in FIG. 4 to selectively deflect the laser housing to cause the beam thereof to scan selected areas of the outermost sheet of the stacked array of sheets disposed in alignment therewith.

In FIG. 4 is shown an apparatus 50 employing a control system of the type illustrated in FIG. 3. The apparatus 50 includes a base 51 containing a receptacle 51R, constructed as described, for retaining a stacked array S' of record sheets S in direct alignment with the output 55 of a laser 56. The laser 56 is shown supported on a shaft 62 which extends horizontally and is connected to the output of a reversible rotary stepping motor 61 supported by a U-frame 54 which is connected to the vertical shaft 53 of a reversible rotary stepping motor 52 supported at the end of arm 51B an extension of an inverted L-frame 51A which is secured to the base 51.

Thus by predeterminately operating stepping motors 52 and 61 by means of signals generated from the memory drum 43 of FIG. 3, the pulsed beam B of laser 56 may be caused to scan and intersect selected areas of the outermost sheet S1 of the stacked array of sheets located on the receptacle 51R.

It is noted that either or both of the rotary stepping motors 52 and 61 of the apparatus 50 of FIG. 4 may be replaced by reversible constant speed motors which are operated by digital or analog signals reproduced from the memory drum and controlled either by an open or closed loop feedback control system of conventional design. A mechanism may also be employed utilizing stepping or constant speed motors which are automatically controlled by signals reproduced from a memory, as described, to move the laser or its mount in two directions at right angles to each other or to move the receptacle 51R in two directions at right angles to each other so as to cause the scanning axis of the laser to scan areas of the stacked sheets which are representative of characters or other information to be recorded by selectively burning through the stacked sheets as described.

In FIG. 5 is shown a modified form of the invention employing a manually operated keyboard to selectively control the described type of radiation beam character recording. The keyboard 60 is provide with a plurality of finger operated keys 61, which are respectively denoted 61A, 61B, 61C, etc., each of which when activated is operable to generate a pulse signal on its output 62 extending to the switching input of a normally open switch 63 which connects a power supply 64 to a plurality of magnetic reproduction heads 65 which reproduce signals from respective tracks 67 of a magnetic record drum 66.

Each of the manually operated switches 61 is also connected to the starting input 69 of an electric motor 68 which operates thereafter to rotate drum 66 one complete revolution after which the motor 68 stops so that all of the signals recorded on the tracks of the drum scanned by the magnetic reproduction heads 65 which are energized through the switch 63 closed by the particular key of the keyboard 60 which is depressed may reproduce all of the signals from their respective scanning tracks.

Assuming that the key 61A is operable to effect the recording of the alphabetical character "A" by the described selective burning of holes through the stack of record sheets, the closure of switch 63A by the activation of key 61A is operable to energize three magnetic reproduction heads 65AH, 65 AV and 65 AL, each of which is operable to reproduce control signals from a respective track of the multiple track magnetic drum 66. Signals reproduced from track 67-1 by reproduction heads 65 AH during the revolution of drum 66 while switch 63 is closed are transmitted to the horizontal deflection control circuits 73 for the radiation beams generating means (e.g. laser or electron gun) these signals may be applied in an open loop or closed loop control system to control the operation of a servo motor of the type hereinbefore described which predeterminately deflects the support for the laser or electron gun in the horizontal direction while signals generated from recordings on track 67-2 by reproduction head 65AV are applied to the vertical deflection control means 72 for the servo or other device employed to vertically deflect the laser or electron gun predetermined degrees in synchronization with the operation of the horizontal deflection device. In the event that deflection plates or other suitable field deflection means are employed, such as in the deflection control of a writing electron beam generated by an electron gun, the signals recorded on tracks 67-1 and 67-2 by the pickup heads 65AH and 65 AV, are respectively operable to provide suitable variable signals to the respective beam deflection means to which their outputs are connected for properly controlling the deflection of the writing beam during an operation in which the particular character is being recorded on the record sheet or stack of sheets.

Simultaneously with the reproduction of deflection control signals from the circular tracks 67-1 and 67-2 of the record drum 66, pulse signals are reproduced from a third track 67-3 by magnetic reproduction head 65AL which is energized with the closing of switch 63 and are transmitted to control the laser 74 to properly generate intense output radiation pulses in synchronization with the deflection control of its beam axis by signals reproduced from tracks 67-1 and 67-2. The output of reproduction head 65AL is transmitted as a plurality of pulses to a normally open switch 76 which gates electrical energy from a suitable power supply 75 to the control input for the laser 74, thereby causing the beam of the laser to be generated intermittently as the laser scanning axis is predeterminately varied to cause the beam B to scan in a path defining the particular character to be recorded and associated with the key 61A which is closed.

It is noted that each of the switches 63 which are energized by manual actuation of the particular key associated therewith, is a multiple pole, normally open switch which is slow-to-open after being closed to permit the switch to be closed for a sufficient time interval for the record drum 66 to make one full revolution so that all of the signals recorded on the tracks thereof which are being reproduced from by the particular group of heads 65 connected to the switch 63 which is so closed, may be reproduced by said heads to effect the recording of a complete character on the record sheet or sheets.

In the recording arrangement illustrated in FIG. 5, the electron gun or laser 74 is assumed to be held stationary while the record member or stack of record members S are prepositioned with respect to the beam generating device and moved to vary the recording location during or between each character recording operation by means of respective motors 79 and 80 which may comprise so called pulse operated stepping motors. First and second push button operated switches 77F and 77R connect to respective forward and reverse drive inputs 79F and 79R of motor 79 which motor is operable to drive the form or record member table 81 in a first direction while third and fourth push button switches 78F and 78R connect to respective forward and reverse drive inputs 80F and 80R of a second stepping motor 80 which is operable to drive the table 81 in a direction normal to the direction in which it is driven by motor 79. Thus, after predeterminately positioning the stack of record members on table or support 81 within a frame or other guide means operable to engage at least two edges of the record member stack, and controlling the movement of the table supporting the frame or support for the record members in two directions, such as by controlling motors 79 and 80 through switches 77F, 77R, 78F and 78R, the operator of the apparatus of FIG. 5 may bring a selected portion of the outermost record member into the scanning field of the laser 74 whereby the recording of characters in a given direction may be effected, as described, by depressing selected of the keys 61A defining respective characters.

It is noted that the output 62 of each of the switches 61 is connected to the input 79F of the stepping motor 79 so that each time a character generating key 61 is closed, the stepping motor 79 will be pulsed and will advance the table 81 in a direction parallel to the band area of the outermost record member along which characters are to be recorded. A time delay relay 82 disposed between the outputs 62 and the input 79F of stepping motor 79 is of sufficient time duration to permit the record drum 66 to cycle and permit the reproduction of a complete number of signals necessary to control the deflection of the beam of the laser 74 while it is pulsed as described, so as to effect the recording of a complete character on that area of the outermost form which is aligned with the scanning field of the laser.

It is noted that while a complete revolution of the record drum 66 has been mentioned herein as permitting the reproduction of deflection control signals capable of controlling the deflection circuits or servo devices associated with deflecting the beam of the laser 74 to scan and record respective characters, groups of the same command control signals may be recorded along each circular track 67 of the drum so that the drum need not be rotated a complete revolution for generating each character.

It is also noted that one or more words, lines or groups of lines of characters may be automatically recorded on selected portions of the forms disposed on table 81 by employing other switches of the keyboard 60 to effect the energization of selected of other magnetic reproduction heads which are operatively coupled to respective record tracks of the drum and which reproduce therefrom signals which are operable to effect the recording of more than one character, a line or a number of lines of characters on selected areas of the outermost record member and the record members stacked therewith as described.

A signal recorded on a particular track of the drum 66 or a cam on the output shaft of the drum drive motor 68 may be employed to close a limit switch 71 to stop the rotation of the drum when a complete cycle of signals has been reproduced therefrom by the selected pickup heads so that only the selected character will be recorded on the record member or members. Motor 68 is started to effect the driving of the drum 66 to effect one complete cycle, whenever one of the switches 61 of the keyboard 60 is operated, thereby gating electrical energy from a suitable power supply through the keyboard to the motor 68 which operates until a limit switch 68S is closed by a cam or pin on the output shaft of said motor thereby pulsing the stop control input 70 to the motor 68. When any of the keys 61 is depressed, a start pulse is transmitted on an output to the start control input 69 of motor 68.

In place of the record drum 66, it is to be noted that various other forms of multiple channel record members or memories may be employed which generates selective command control signals for controlling the local deflection and pulsing of the laser or electron gun to cause same to scan and record characters as described. If it is desired to record a plurality of characters along a selected line or band area of each of the record members, suitable deflection control and laser pulsing signals may be reproduced from selected tracks of the drum 66 by selectively operating switches on the control console 59. Also it is to be noted that each of the switches 61 of the keyboard 60 may connect to a separate logical signal generating element, such as an integrated circuit, which generates on its outputs the necessary deflection control signals for controlling the character scanning and recording operations.

In the control diagrams of FIGS. 3 and 5, where not illustrated, it is assumed that the correct power supplies are provided on the correct sides of all switches, motors, transducers, counters, relays and other electrical components and sub-systems.

It is noted that by deflection controlling and pulsing the laser beam by means of signals reproduced from a memory, each recording of the same character will be composed of discolorations, burnings, cavities or holes through the record member or members wherein the spot-like recordings, cavities or holes for the same characters will be similarly located, thereby providing uniform character recordings which may be easily machine read. In a preferred embodiment, the spot-like areas, cavities or holes are equispaced as a result of the recording beam being pulsed and/or interrupted for equal periods. In addition to the electro-mechanical means provided in the drawings for deflection controlling the recording beam, means such as provided in U.S. Pat. No. 3,992,682 and the references thereof may be employed to deflection control and position the beam during recording.

I claim:

1. A method for recording information in the configuration of visually readable alpha-numeric characters comprising:

intermittently energizing a source of beam radiation to generate pulses of said radiation, which pulses are of substantially equal duration and intensity and are generated at sufficient intensity to physically change the characteristics of a record member, directing said radiation beam at a first portion of a record member capable of being physically changed by the radiation of said beam to cause a first pulse thereof to intersect and change a first spot-like area of said record member and to cause said first spot-like area to be visually discernible from the area of said record member surrounding said spot-like area, multiple-axis deflection controlling said beam to cause said beam to scan said record member along multiple axes in movement with respect to said record member, which movement is in a path across said record member defining a first alphabetical or numerical character, synchronizing the deflection controlled movement of said beam with the pulsing of said beam to cause said beam to change the physical characteristics of selected of a plurality of spot-like areas of said record member so as to effect a first recording of visually readable spot-like portions of the material of said record member, which visually readable spot-like portions define a first alphabetical or numerical character, deflection controlling said beam while continuing to intermittently energize said beam and to generate pulses of beam energy of sufficient intensity to change the physical characteristics of selected spot-like areas of a selected area adjacent said first portion of said record member so as to effect a second recording of visually readable spot-like portions of said record member and to define a second visually readable alphanumerical character at said second area, repeating the aforesaid steps for recording additional characters along selected additional areas of said record member adjacent said second area, and causing radiation of said beam to completely pass through said record member and to intersect a recording surface on the other side of said record member so as to effect a recording on said surface on the other side of said record member, which latter recording defines visually readable characters which are similar to the alpha-numeric characters generated by the pulses of radiation directed originally from said source at said record member.

2. A method in accordance with claim 1 wherein said radiation beam is operable to effect a change in color of said spot-like areas of said record member.

3. A method in accordance with claim 2 wherein said radiation beam is operable to burn said spot-like areas of said record member.

4. A method in accordance with claim 1 wherein said radiation beam is generated at sufficient intensity to burn cavities in said record member.

5. A method in accordance with claim 1 wherein said record member is a sheet and said radiation beam is operable to burn holes through said sheet.

6. A method in accordance with claim 5 wherein a second record member is disposed behind said sheet and said beam is operable to change the physical characteristics of spot-like areas of said record member in alignment with the holes burned through said record member.

7. A method in accordance with claim 6 wherein said radiation beam is operable to burn holes through both said record members.

8. A method for producing multiple copies of information comprising the steps of:

generating radiation from a source as a beam of sufficient intensity to pass through and change the physical characteristics of a plurality of record sheets, multiple axis deflection controlling said beam by pivoting said source about two mutually perpendicular axes to move said beam in two directions so as to define a scanning path at a recording zone which path defines the contours of a plurality of selected characters, predeterminately interrupting said beam by pulsing said beam at its source in synchronization with the multiple axis deflection thereof so as to generate and direct pulses of intense radiation against the surface of a first sheet of record material wherein said beam is interrupted and deflection controlled in such a manner that a plurality of such pulses intersect each character location of said sheet and physically change selected spot-like portions of each of said character locations by means of the heat of said pulsed radiation to effect recordings in said first sheet defining an alphanumeric character at each of said locations wherein each of said character recordings comprises a plurality of spot-like changes in the physical characteristics of said sheet which spot-like changes are predeterminately located within each character recorded, and disposing a second sheet behind said first sheet and sequentially passing said pulses of beam radiation through said first sheet to said second sheet at sufficient intensity to effect a plurality of character defining recordings in selected locations of said second sheet which recordings are of substantially the same nature and configurations as the recordings defined by the spot-like changes affected by said pulsed beam radiation in said selected locations of said first sheet.

* * * * *